United States Patent
Park et al.

(10) Patent No.: US 12,071,108 B2
(45) Date of Patent: *Aug. 27, 2024

(54) EXTERIOR CAMERA LENS CLEANING SYSTEM AND CLEANING METHOD THEREOF

(71) Applicants: Hyundai Motor Company, Seoul (KR); Kia Motors Corporation, Seoul (KR); SL Corporation, Daegu (KR)

(72) Inventors: Jong Min Park, Seoul (KR); Nak Kyoung Kong, Gyeonggi-do (KR); Ki Hong Lee, Seoul (KR); Seung Hwan Kim, Gyeonggi-do (KR); Seung Hyeok Chang, Gyeonggi-do (KR); Yong Hwan Kim, Gyeongsangbuk-do (KR); Jin Sik Nam, Gyeongsangbuk-do (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 958 days.

This patent is subject to a terminal disclaimer.

(21) Appl. No.: 17/019,910

(22) Filed: Sep. 14, 2020

(65) Prior Publication Data

US 2020/0406865 A1 Dec. 31, 2020

Related U.S. Application Data

(62) Division of application No. 16/201,323, filed on Nov. 27, 2018, now Pat. No. 10,814,839.

(30) Foreign Application Priority Data

Aug. 10, 2018 (KR) .................. 10-2018-0093945

(51) Int. Cl.
*B60S 1/56* (2006.01)
*B08B 1/10* (2024.01)
(Continued)

(52) U.S. Cl.
CPC ............... *B60S 1/566* (2013.01); *B08B 1/10* (2024.01); *B08B 3/08* (2013.01); *B60R 1/25* (2022.01);
(Continued)

(58) Field of Classification Search
CPC ...... B60S 1/02; B60S 1/04; B60S 1/46; B60S 1/56; B60S 1/566; B60S 1/66;
(Continued)

(56) References Cited

U.S. PATENT DOCUMENTS

| | | | |
|---|---|---|---|
| 5,426,813 A | 6/1995 | Miki et al. | |
| 10,011,230 B1 | 7/2018 | Brown et al. | |
| 10,053,015 B2 | 8/2018 | Peterson et al. | |
| 2004/0130813 A1 | 7/2004 | Olijnyk et al. | |
| 2006/0232670 A1 | 10/2006 | Chu | |

(Continued)

FOREIGN PATENT DOCUMENTS

| | | |
|---|---|---|
| CN | 203739845 U | 7/2014 |
| CN | 105034950 A | 11/2015 |

(Continued)

*Primary Examiner* — David G Cormier
(74) *Attorney, Agent, or Firm* — Fox Rothschild LLP

(57) ABSTRACT

An exterior camera system and a cleaning method thereof are provided. The exterior camera system includes a base unit that is fixed to a vehicle, a housing rotatably coupled with the base unit, and an imaging device including a camera module and having at least a portion inserted into the housing to move in a longitudinal direction of the housing. A wiper is disposed on an inside surface of the housing to face the camera module, and a washer fluid nozzle is disposed adjacent to the wiper. A controller receives a video from the camera module to set a rotation angle of the housing based upon driving conditions of the vehicle and to adjust extension of the imaging device.

6 Claims, 11 Drawing Sheets

(51) Int. Cl.
*B08B 3/08* (2006.01)
*B60R 1/25* (2022.01)
*B60R 1/26* (2022.01)
*B60R 1/28* (2022.01)
*B60R 11/04* (2006.01)
*G02B 27/00* (2006.01)
*B60R 11/00* (2006.01)

(52) U.S. Cl.
CPC .................. *B60R 1/26* (2022.01); *B60R 1/28* (2022.01); *B60R 11/04* (2013.01); *G02B 27/0006* (2013.01); *B60R 2011/004* (2013.01); *B60R 2011/0082* (2013.01); *B60R 2011/0085* (2013.01); *B60R 2011/0092* (2013.01); *B60R 2300/8046* (2013.01)

(58) Field of Classification Search
CPC ........... B60S 1/0848; B60R 1/00; B60R 1/20; B60R 1/22; B60R 1/23; B60R 1/24; B60R 1/25; B60R 1/26; B60R 1/27; B60R 1/28; B60R 11/04; B60R 2011/004; B60R 2011/0082; B60R 2011/0085; B60R 2011/0092; B08B 3/08; B08B 7/04
See application file for complete search history.

(56) References Cited

U.S. PATENT DOCUMENTS

| | | |
|---|---|---|
| 2009/0045323 A1* | 2/2009 | Lu .......................... G06T 7/80 |
| | | 250/208.1 |
| 2017/0080863 A1 | 3/2017 | Henion et al. |
| 2018/0126910 A1 | 5/2018 | Herrmann et al. |
| 2018/0186341 A1 | 7/2018 | Kimura et al. |
| 2018/0361998 A1 | 12/2018 | Renaud |
| 2019/0009752 A1* | 1/2019 | Rice .......................... B60S 1/56 |

FOREIGN PATENT DOCUMENTS

| | | |
|---|---|---|
| EP | 0 536 453 A1 | 4/1993 |
| EP | 3 321 132 A1 | 5/2018 |
| JP | H 03178842 A | 8/1991 |
| JP | H 1199912 A | 4/1999 |
| JP | 2014-133440 A | 7/2014 |
| JP | 2015-182656 A | 10/2015 |
| JP | 2015189291 A | 11/2015 |
| JP | 2017208781 A | 11/2017 |
| KR | 10-2007-0063485 A | 6/2007 |
| KR | 10-2008-0026988 A | 3/2008 |
| KR | 200442581 Y1 | 11/2008 |
| KR | 10-2010-0089320 A | 8/2010 |

\* cited by examiner

Related Art

View X

- TOP View -

- View X -

- TOP View -

- View X -

[ B-B CROSS-SECTION ]

EXTERIOR CAMERA LENS CLEANING SYSTEM AND CLEANING METHOD THEREOF

CROSS-REFERENCE TO RELATED APPLICATION

This application is a Divisional Application of U.S. Ser. No. 16/201,323 filed on Nov. 27, 2018, which claims priority from Korean Patent Application No. 10-2018-0093945 filed on Aug. 10, 2018, the entire contents of which are incorporated herein by reference.

BACKGROUND

(a) Technical Field

The present disclosure relates to an exterior camera lens cleaning system and a cleaning method thereof, and more particularly, to an exterior camera lens cleaning system and a cleaning method thereof, in which an exterior camera system includes a camera inserted into a housing and performs the cleaning of the lens of the camera using a wiper configuration disposed on an inside surface of the housing.

(b) Related Art

Generally, a vehicle changes driving lanes using a rear-view mirror that is disposed at front center of the vehicle cabin and a side mirror. When a driver changes driving lane while watching the side mirror of the driving direction, collisions with a vehicle being driven in a blind spot or a preceding vehicle frequently occur. In addition, when the vehicle is parked or stopped, the conventional side mirror is configured to be folded while protruding toward the outside, and is damaged by a physical impact to the side mirror.

Recently, a camera mirror system (CMS), which displays the external situation of a vehicle on a screen through an external camera lens, has been developed. As described above, the vehicle incorporating the CMS system photographs the external surroundings of the vehicle using an exterior camera that protrudes outward of the vehicle, and displays a video photographed by the exterior camera on a display disposed within the vehicle.

FIG. 1 illustrates an exterior camera system of the related art that is rotated at and protruded from the exterior surface of the vehicle. As illustrated, the system includes an exterior camera 20 disposed at one side of a door 11 of the vehicle, and the exterior camera includes a first lens 30 and a second lens 31 to be rotatable toward the inside of the door.

However, in the exterior camera configured to be inserted into and protrude from the door, the protrusion amount of the exterior camera is minimal, and it is more difficult to observe the side and rear views of the vehicle. In addition, when the exterior camera is installed to provide a particular amount of protrusion, even when the exterior camera is inserted into the housing, the protrusion is still present, and it is more difficult to protect the exterior camera.

The above information disclosed in this section is merely for enhancement of understanding of the background of the disclosure, and accordingly it may contain information that does not form the prior art that is already known in this country to a person of ordinary skill in the art.

SUMMARY

An object of the present disclosure is to provide an exterior camera system that protects an exterior camera and secures wide views of the side and rear thereof. Another object of the present disclosure is to provide an exterior camera system that provides an exterior camera capable of rotating and extending in the longitudinal direction using one actuator. In addition, the present disclosure provides a wiper configuration disposed on an inside surface of a housing that faces the camera module, and provides an exterior camera lens cleaning system that may clean the lens of the camera module.

The objects of the present disclosure are not limited to the above-mentioned objects, and other objects not mentioned may be understood by the following description and may be more clearly understood by the exemplary embodiments of the present disclosure. In addition, the objects of the present disclosure may be realized by the means illustrated in the claims and their combinations.

In an aspect of the present disclosure, an exterior camera system may include a base unit fixed to a vehicle; a housing rotatably coupled with the base unit; and an imaging device including a camera module and having at least a portion inserted into the housing to move in a longitudinal direction of the housing. The system may further include a wiper disposed within the housing to face the camera module; a washer fluid nozzle disposed adjacent to the wiper; and a controller configured to receive a video from the camera module, to set a rotation angle of the housing based on the state of the vehicle, and to adjust extension of the imaging device. In particular, when the housing is rotated by the controller, the imaging device may move synchronously with the housing horizontally in the longitudinal direction of the housing.

In addition, the housing may include a gear unit configured to rotate the housing, and an actuator configured to operate the gear unit. The imaging device may include a rack gear unit interlocked with the gear unit and configured to move the imaging device in the longitudinal direction thereof when the housing is rotated.

The exterior camera system may further include a reflection unit disposed on a side surface of the housing on which the camera module is exposed. The system may further include a housing cover cap disposed within the housing adjacent to the wiper and the washer fluid nozzle, and the housing cover cap may be coupled on an inside surface of the housing.

Furthermore, each of the housing and the imaging device may include at least one end coupled with a rail to slidably move the imaging device in the longitudinal direction of the housing along the rail. The housing and the imaging device may be synchronously operated by an actuator. The controller may be configured to set the rotation angle of the housing based upon a vehicle speed.

In addition, the exterior camera system may further include a washer fluid hose fluidly connected with the washer fluid nozzle. A flow path aperture may be included to allow the washer fluid hose to connect with the vehicle. The housing may include a housing aperture disposed adjacent to the base unit to prevent the housing from interfering with the washer fluid hose upon rotation thereof.

According to another aspect of the present disclosure, a method of cleaning an exterior camera lens may include determining a degree of contamination of a camera module; performing cleaning of the camera module when the degree of contamination of the camera module is equal to or greater than a predetermined reference; and adjusting a number of times that washer fluid is injected through a washer fluid nozzle and a number of times that an imaging device is inserted into a housing and then ejected therefrom based on current driving state of a vehicle or a vehicle speed.

In addition, the controller may be configured to determine the degree of contamination by logically dividing a screen into a plurality of grids to count a number of perceptible grids. The controller may be configured to determine the number of times that the washer fluid is injected through the washer fluid nozzle and the number of times that the imaging device is inserted into and then ejected from the housing based upon the vehicle speed to perform the cleaning the camera module.

Furthermore, the housing may have a particular folding speed when the vehicle is operating in an autonomous driving mode. The controller may further be configured to receive an amount of precipitation from a rain sensor. The controller may be configured to set at least two levels of a folding speed of the housing based on the amount of the received precipitation.

The present disclosure may obtain the following effects in accordance with the above-described exemplary embodiments as well as the configuration, the combination, and the use relationship that will be described below. The present disclosure may provide clearer side and rear views. In addition, the exterior camera may simultaneously rotate and extend in the longitudinal direction thereof, and may have the effect of protecting the exterior camera. The exterior camera lens cleaning system may set the rotation angle of the housing based upon driving conditions, and may have the effect of enhancing fuel efficiency by minimizing an aerodynamic drag caused by the protrusion of the exterior camera. Other aspects and exemplary embodiments of the disclosure are discussed infra.

BRIEF DESCRIPTION OF THE DRAWINGS

The above and other features of the present disclosure will now be described in detail with reference to exemplary embodiments thereof illustrated in the accompanying drawings which are given herein below by way of illustration only, and thus are not limitative of the present disclosure, and wherein.

Figure 1:
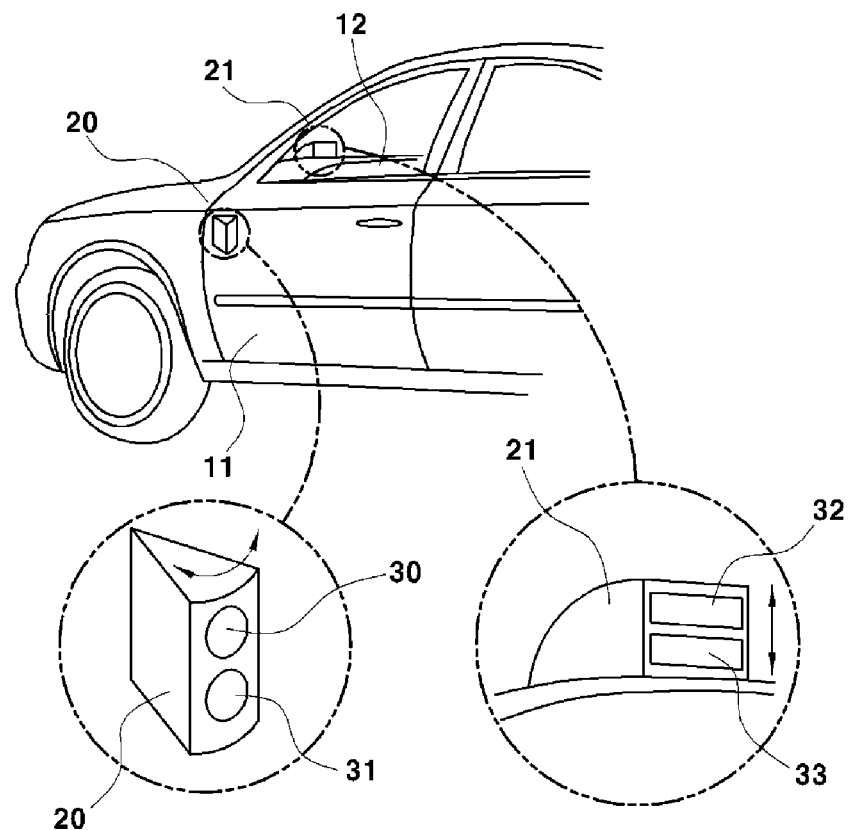
FIG. 1 illustrates an exterior camera system protruded to the outside of a vehicle in the related art.

It should be understood that the appended drawings are not necessarily to scale, may present simplified representation of various exemplary features illustrative of the basic principles of the disclosure. The specific design features of the present disclosure as disclosed herein, including, for example, specific dimensions, orientations, locations, and shapes will be determined in section by the particular intended application and use environment. In the figures, reference numbers may refer to the same or equivalent sections of the present disclosure throughout the figures of the drawing.

DETAILED DESCRIPTION

Hereinafter, exemplary embodiments of the present disclosure will be described more in detail with reference to the accompanying drawings. The exemplary embodiments of the present disclosure may be modified in various forms, and the scope of the present disclosure should not be construed as being limited to the following exemplary embodiments. The exemplary embodiments are provided to more fully explain the present disclosure to those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." In addition, the terms " . . . part," " . . . unit," " . . . module," etc., which are described in the specification, may mean a unit for processing at least one function or operation, which can be implemented by hardware or software, or a combination of hardware and software.

The present disclosure relates to a camera monitoring system (CMS) configured to capture the side and rear videos of a vehicle using an exterior camera module 320 and display the videos inside the vehicle, and provides the technology that may simultaneously perform the rotation and extension of an exterior camera based on the driving conditions of the vehicle, the vehicle speed, and the like.

In addition, an exemplary embodiment of the present disclosure may include an imaging device 300 that may be inserted into a housing 200, and provides an exterior camera lens 330 cleaning system disposed to allow a lens 330 of the camera module 320 to abut (e.g., contact) a wiper 240 disposed within the housing 200 to remove contaminants present on the camera lens 330.

Further, an exemplary embodiment of the present disclosure may include a washer fluid nozzle 260 disposed adjacent to the wiper 240 and a washer fluid hose 270 configured to supply the washer fluid from within the vehicle to the washer fluid nozzle 260. The wiper 240 may perform physical cleaning simultaneously or sequentially with the ejection of the washer fluid based on the degree of contamination of the camera module 320.

Figure 2:
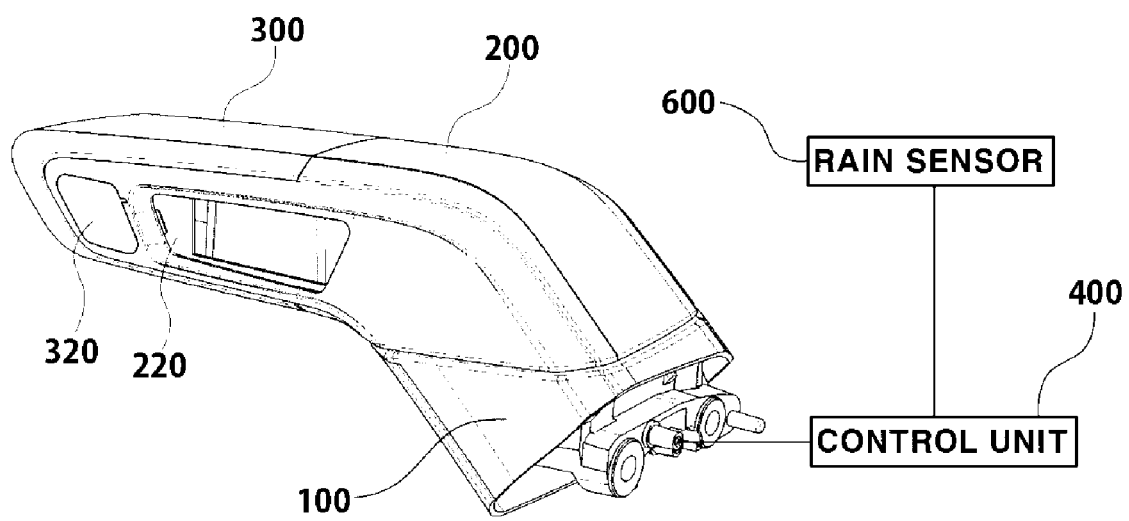
FIG. 2 is a diagram of an exterior camera lens cleaning system according to an exemplary embodiment of the present disclosure.

FIG. 2 is a diagram of the exterior camera lens 330 cleaning system according to an exemplary embodiment of the present disclosure. As illustrated, the exterior camera of the present disclosure may be disposed on a fender or door of a vehicle, and may be provided at both side ends of the vehicle to be symmetrical. The exterior camera configuration of the present disclosure may be alternatively mounted on a corresponding location of the conventional side mirror. The exterior camera may include a base unit 100 fixed to the outside of the vehicle, the housing 200 configured to be rotatable with respect to the base unit 100, and the imaging device 300 configured to be inserted into the housing 200 and to move horizontally along the longitudinal direction of the housing 200 based on driving conditions.

The imaging device 300 may include the camera module 320 at one end, and when the imaging device 300 is inserted into the housing 200 based on the driving conditions of the vehicle and the vehicle speed, the camera module 320 may be unexposed to the outside. In addition, an exemplary embodiment of the present disclosure may include a reflection unit 220 to allow the camera module 320 to monitor (e.g., identify) the side and rear of the vehicle under the unexposed situation, and the reflection unit 220 may be disposed on the side surface of the housing 200 on which the camera module 320 is exposed. When the housing 200 rotates with respect to the base unit 100, the imaging device 300 may be configured to move in the horizontal direction based on the rotation of the housing 200.

Moreover, when the housing 200 rotates in a direction away from the vehicle, the imaging device 300 may be configured to move horizontally in the direction away from the housing 200, and when the housing 200 rotates in the direction toward the vehicle, the imaging device 300 may be configured to move to be inserted into the housing 200. In addition, the housing 200 and the imaging device 300 may be operated synchronously by a driving force, and thereby, the rotation motion of the housing 200 and the linear motion of the imaging device 300 may be simultaneously performed by an actuator 500 coupled by a plurality of gears.

Further, the washer fluid hose 270 connected with the washer fluid nozzle 260 may provide the washer fluid from the inside of the vehicle to the washer fluid nozzle 260, and a flow path aperture 110 may be disposed on the base unit 100 to allow the washer fluid hose 270 to penetrate the base unit 100. A housing aperture 280 may be included in the housing 200 while facing the base unit 100 to prevent the housing 200 from interfering with the washer fluid hose 270 upon the rotation of the housing 200. Accordingly, the housing 200 may be configured to rotate without interfering with the washer fluid hose 270 through the flow path aperture 110 and the housing aperture 280.

Figure 3:
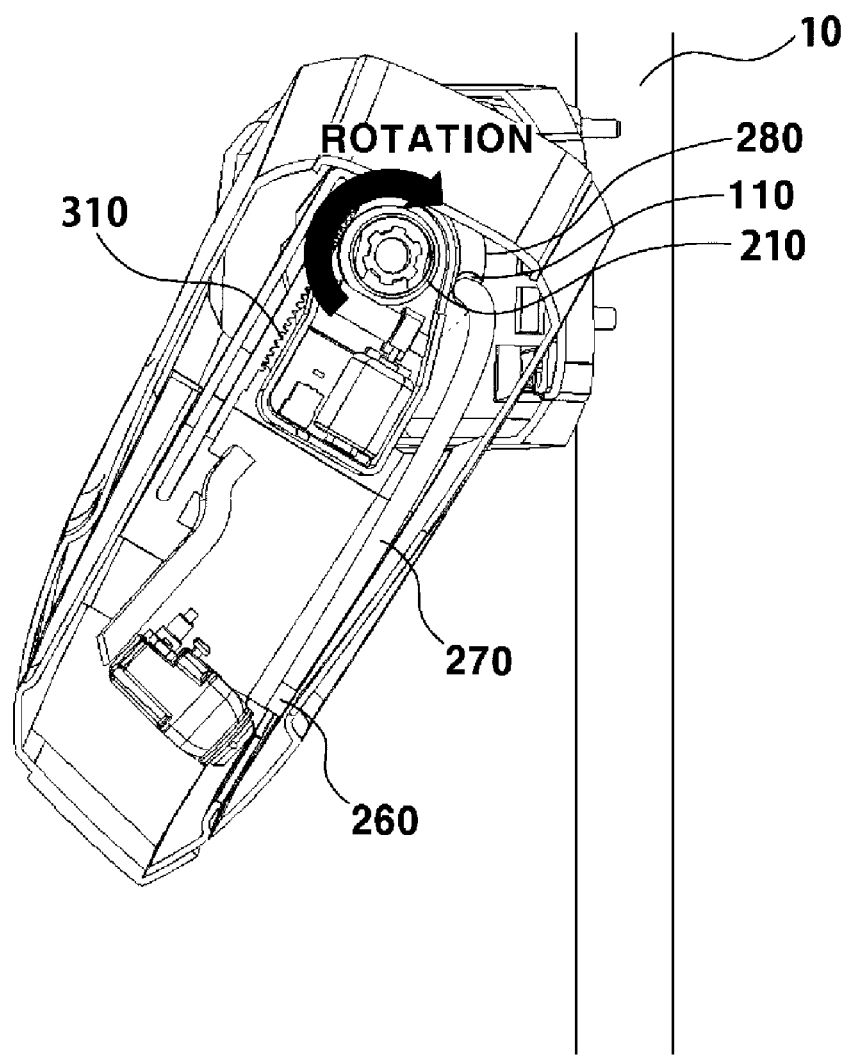
FIG. 3 illustrates the exterior camera lens cleaning system when a camera module is inserted into a housing according to an exemplary embodiment of the present disclosure.

FIG. 3 is a diagram that illustrates when the housing 200 is disposed closest to the vehicle according to an exemplary embodiment of the present disclosure. As illustrated, the exterior camera of the present disclosure may allow the housing 200 to be folded to a position closest to the vehicle, for example, when the vehicle stops. When the exterior camera is folded to the position closest to the vehicle, the imaging device 300 may be inserted into the housing 200 to cause the camera module 320 to be unexposed to the outside.

For example, a controller 400 of the vehicle may be configured to detect a stop state of the vehicle and rotate a gear unit 210 of the housing 200, and the housing 200 may enter the folded state by the rotation of the gear unit 210. In addition, a rack gear unit 310 coupled (e.g., meshed; interlocked) with the gear unit 210 and fixed to the housing 200 may be configured to move in the direction being inserted into the housing 200, and the imaging device 300 that moves with the rack gear unit 310 may include at least a portion inserted into the housing 200.

Figure 4:
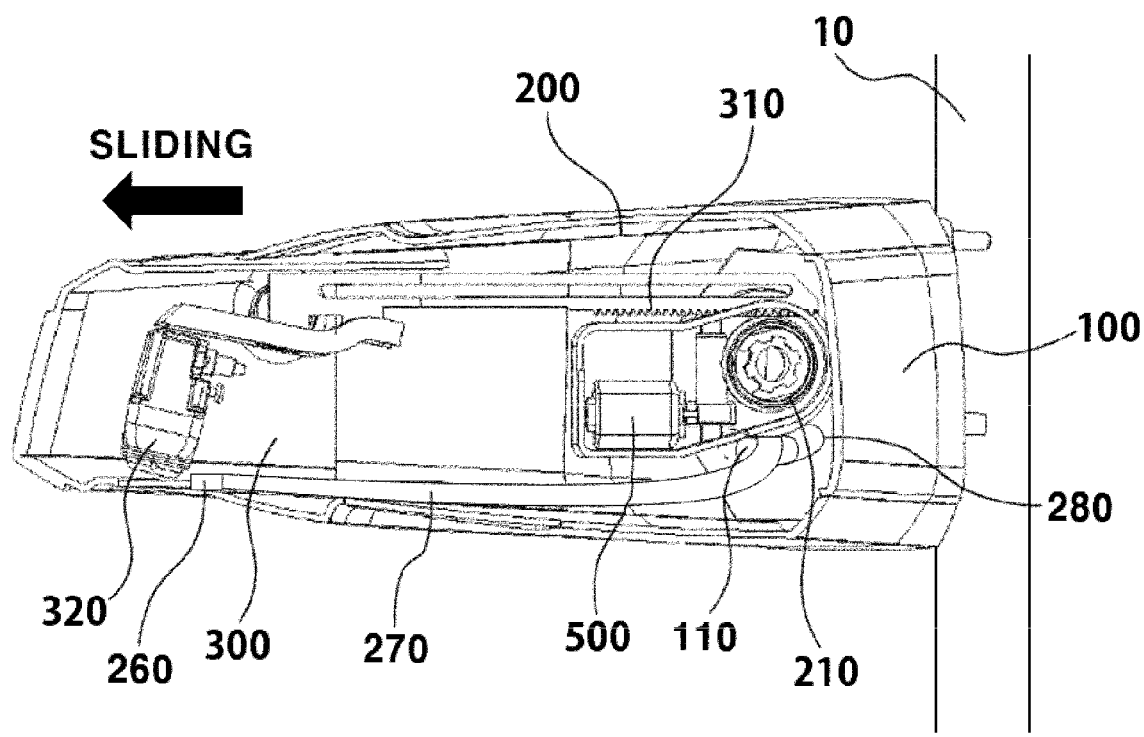
FIG. 4 illustrates the exterior camera lens cleaning system when the camera module is extended along the housing according to an exemplary embodiment of the present disclosure.

FIG. 4 illustrates a configuration of the exterior camera that is rotated (e.g., extended) under the condition of the vehicle driving (including low-speed driving, reverse driving, and autonomous driving) according to an exemplary embodiment of the present disclosure. As illustrated, the imaging device 300 may be configured to move horizontally in the direction away from the vehicle to expose the camera module 320 to the exterior while the vehicle is being driven.

Figure 5:
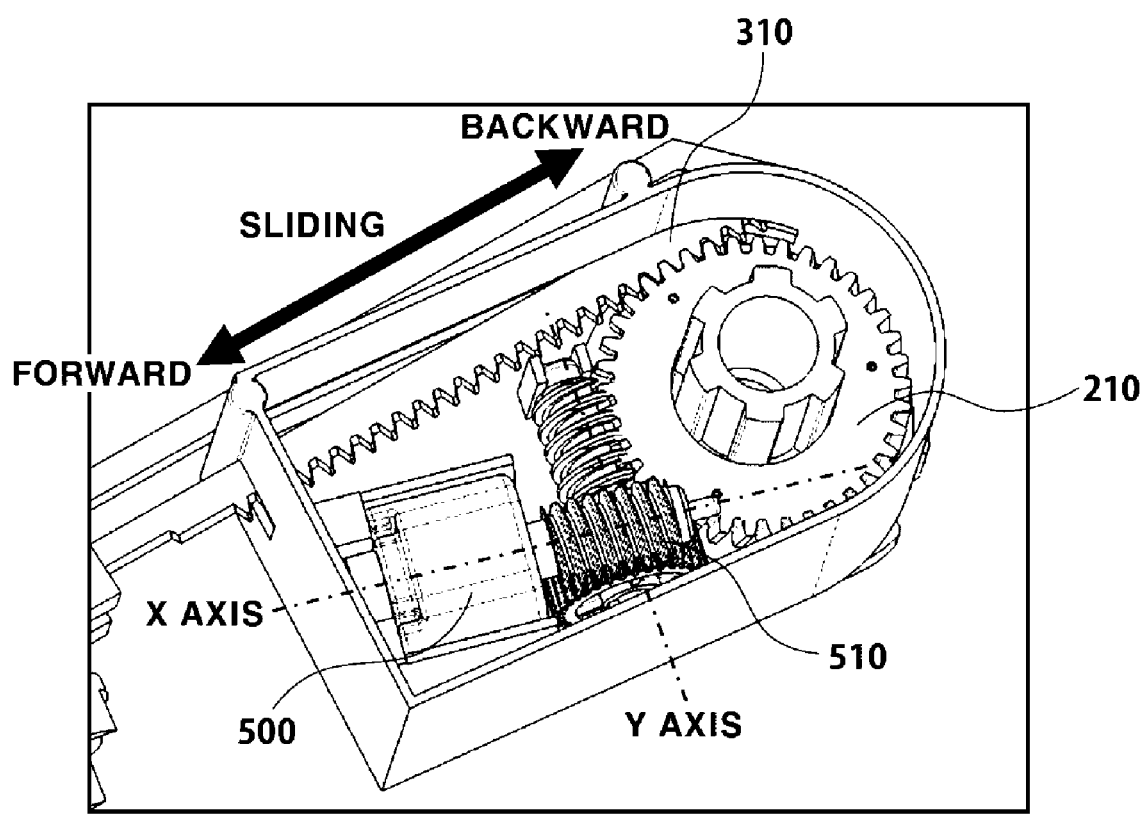
FIG. 5 is a diagram configured showing a synchronous motion between the housing and the imaging device according to an exemplary embodiment of the present disclosure.

In an exemplary embodiment of the present disclosure, the driving force may be applied to cause the housing 200 to be rotated and simultaneously, the imaging device 300 to perform the horizontal motion by an actuator 500, and as illustrated in FIG. 5, the imaging device 300 may include the gear unit 210 configured to rotate the housing 200 and the rack gear unit 310 to be coupled with the gear unit 210 and to move the imaging device 300. Accordingly, the gear unit 210 may be configured to perform rotational movement upon the operation of the actuator 500, and the rack gear unit 310 coupled with the gear unit 210 may be configured to move in the horizontal direction thereof and simultaneously perform the rotational motion of the housing 200 and the linear motion of the imaging device 300.

As illustrated in FIGS. 3 and 4, the exemplary embodiment of the present disclosure may adjust the rotation angle of the exterior camera based upon driving conditions of the vehicle and adjust the exposure of the camera module 320, and may clean the camera module 320 using the wiper 240 and the washer fluid nozzle 260 disposed within the housing 200 when contamination is present in the camera module 320. In other words, when the imaging device 300 is inserted into and subsequently extended from the housing 200, the wiper 240 may face the camera module 320 on the inside surface of the housing 200, and the washer fluid nozzle 260 may be configured to dispense (e.g., eject) the washer fluid toward the camera module 320 to remove the contamination from the camera module 320. For example, the controller 400 may be configured to remove the contamination of the camera module 320 using the wiper 240 after dispensing the washer fluid through the washer fluid nozzle 260.

FIG. 5 illustrates the coupling of the gear unit 210 of the housing 200 and the rack gear unit 310 of the imaging device 300 according to an exemplary embodiment of the present disclosure. As illustrated, the exemplary embodiment may include a motor as the actuator 500, and one end of the motor may be connected with a worm gear 510 and the worm gear 510 may be directly or indirectly coupled with the gear unit 210. Accordingly, when the motor rotates around the X axis, the worm gear 510 coupled with the gear unit 210 may rotate around the Y axis. In addition, the rack gear unit 310 gear-coupled with the gear unit 210 may move in the horizontal direction.

Accordingly, the housing 200 in which the gear unit 210 is fixedly disposed may be configured to rotate, and the imaging device 300 may be configured to horizontally move in the longitudinal direction of the housing 200 to insert at least a portion of the imaging device 300 into the housing 200.

Figure 6A:
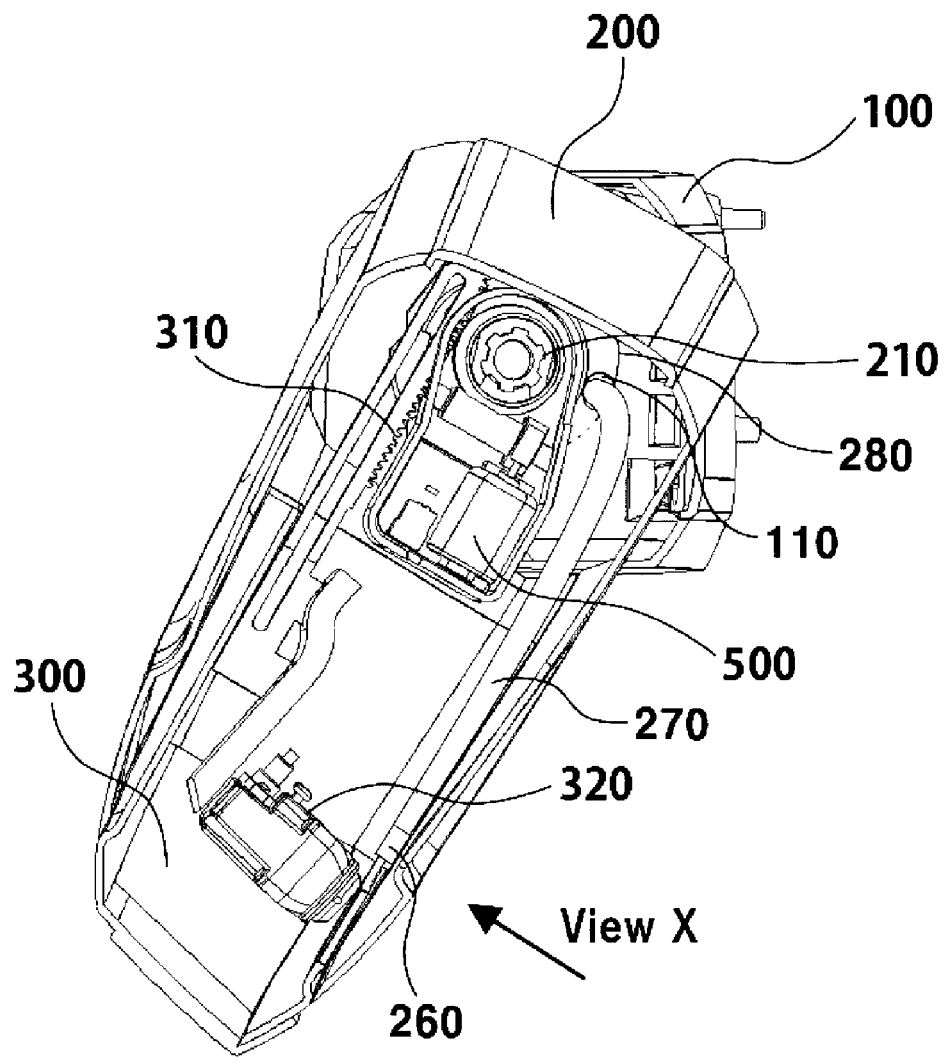
FIG. 6A illustrates a state in which the exterior camera is inserted into the housing according to an exemplary embodiment of the present disclosure.
Figure 6A:
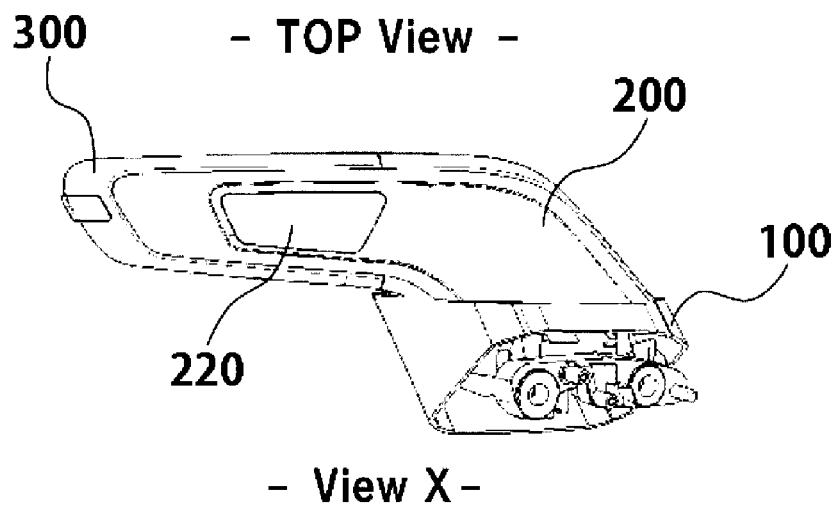
Figure 6B:
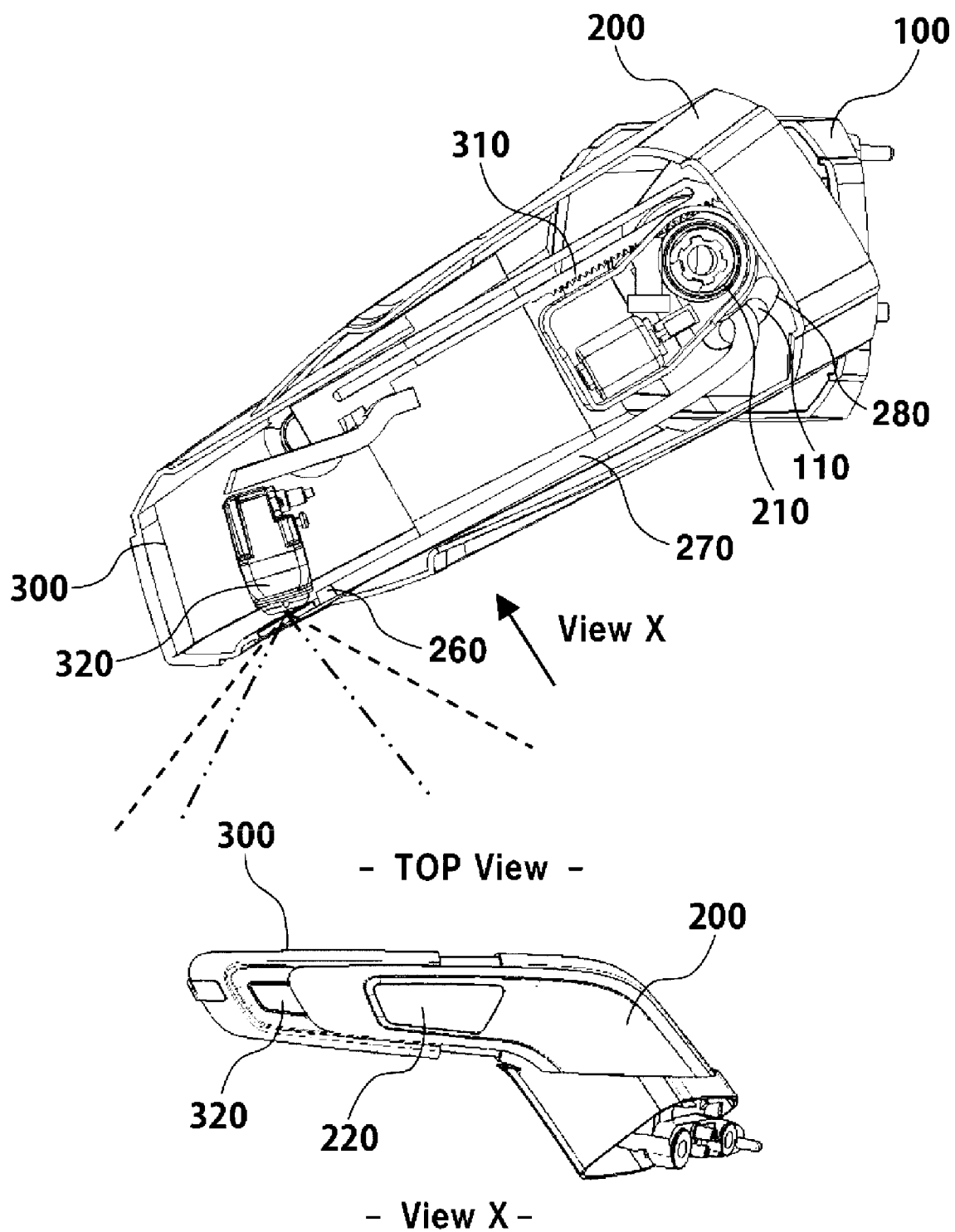
FIG. 6B is a diagram of the exterior camera showing a state in which the side and rear views are provided according to an exemplary embodiment of the present disclosure.
Figure 6C:
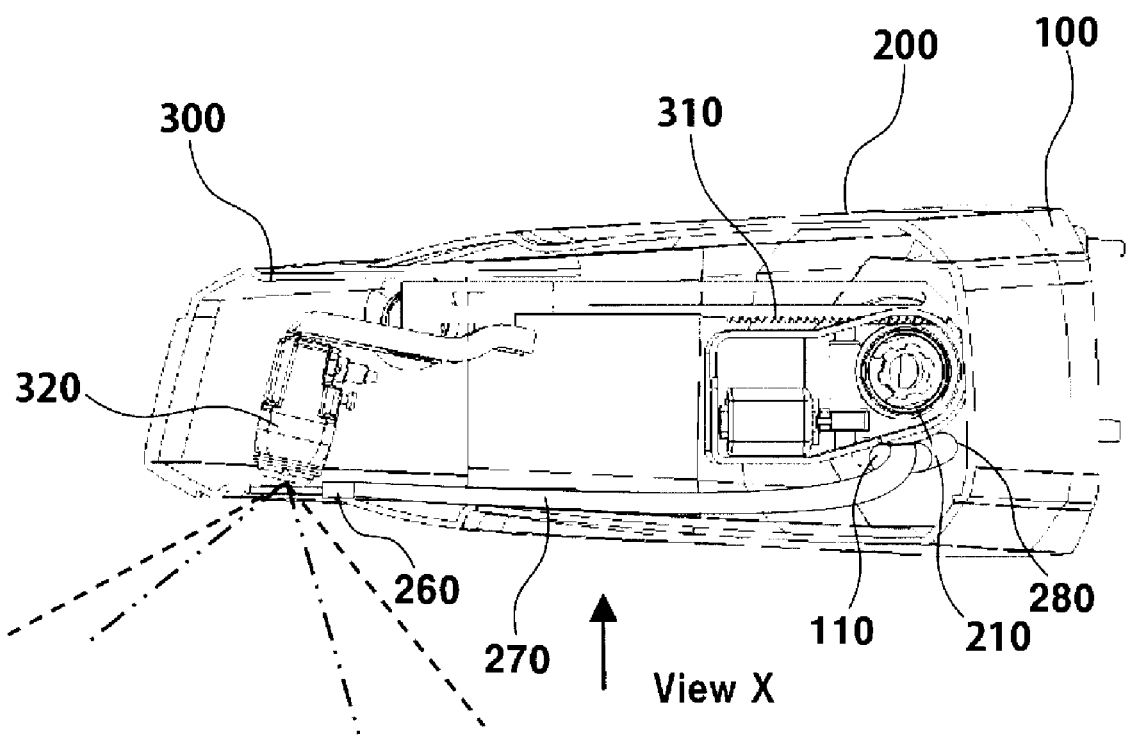
FIG. 6C is a diagram showing a state in which the exterior camera is fully extended according to an exemplary embodiment of the present disclosure.
Figure 6C:
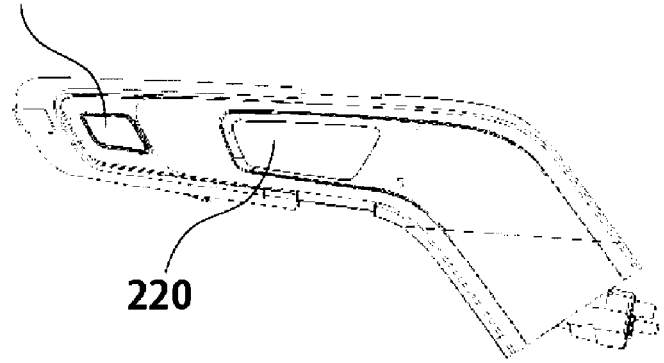

FIGS. 6A to 6C illustrate the rotation state of the exterior camera based upon the operating conditions of the vehicle according to an exemplary embodiment of the present disclosure. FIG. 6A illustrates the state where the exterior camera is folded due to, for example, the stop state of the vehicle or an operator manipulation. As illustrated, the exterior camera may be rotated and disposed at the closest position to a vehicle body 10, and the imaging device 300 may be inserted into the housing 200 to a position where the camera module 320 is unexposed to the exterior.

FIG. 6B illustrates the position of the exterior camera when the vehicle operates under particular conditions, for example, at or above a particular speed. As illustrated, the housing 200 may be configured to rotate by a set angle in the width direction of the vehicle at or greater than a particular speed of the vehicle, and the camera module 320 of the imaging device 300 may protrude to the outside of the housing 200 to be exposed to the exterior. In an exemplary embodiment of the present disclosure, the camera module 320 may include a wide angle camera, and for example, may include a wide angle camera having a field of view of about 180° or greater.

As described above, FIG. 6B illustrates the exterior camera disposed in the vehicle that is operating at or greater than a particular speed, and in the exterior camera, the housing 200 may be set to a maximum angle of about 160° or less with respect to the width direction of the vehicle body 10 to decrease an aerodynamic drag.

In FIG. 6C, the housing 200 may maintain the maximum open state during the reverse or low-speed operation of the vehicle, and an exemplary embodiment of the present disclosure may maintain the position that is in parallel with the width direction of the vehicle by rotating to about 180° that is the maximum open angle. In addition, referring to FIGS. 6B to 6C, the focus of the camera module 320 may be set to different angles. However, the controller 400 may be configured to correct the video photographed by the wide angle camera of 180° or greater, and may be configured to display a consistent side surface video regardless of the rotation angle of the housing 200. For example, when the vehicle is driven at a particular speed or greater, the video photographed using the camera module 320 may provide a narrower field of view than the video photographed during the low-speed operation (e.g., less than the particular speed) or the reverse driving.

Figure 7:
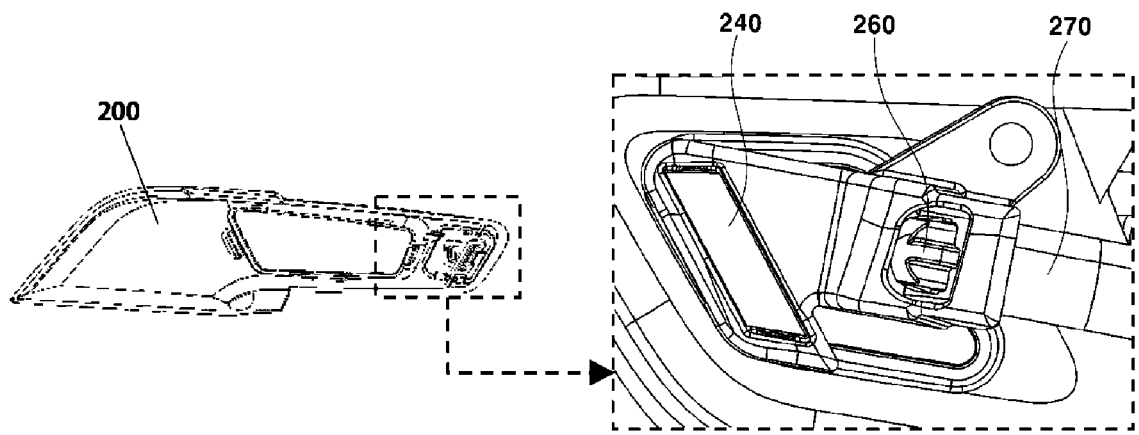
FIG. 7 is a diagram of a wiper configuration disposed within the housing according to an exemplary embodiment of the present disclosure.

FIG. 7 illustrates the inside of the housing 200 where the wiper 240 and the washer fluid nozzle 260 are disposed according to an exemplary embodiment of the present disclosure. As illustrated, the wiper 240 may be mounted to face the camera module 320 within the housing 200, and the wiper 240 may be disposed on a housing cover cap 230 to be selectively separable from the housing 200. For example, the washer fluid nozzle 260 may be formed adjacent to the wiper 240, and the wiper 240 and the washer fluid nozzle 260 may be disposed on the housing cover cap 230.

The wiper 240 may be disposed to face the lens 330 of the camera module 320, and when the imaging device 300 is inserted into or extended from the inside surface of the housing 200, the wiper 240 may clean the lens 330 of the camera module 320. For example, in an exemplary embodiment of the present disclosure, the controller 400 may be configured to logically divide the lens 330 into a plurality of grids to measure the contamination of the lens 330 and measure the number of contaminants in the divided grids to determine the degree of contamination of the camera module 320.

Thus, when the degree of contamination of the camera module 320 is equal to or greater than a reference value that is set in the controller 400, the wiper 240 may perform the cleaning of the camera module 320 and the imaging device 300 may be inserted into and subsequently extended from the housing 200, and thereby, the wiper 240 may clean the camera module 320 twice, e.g., during the insertion and during the extension.

In addition, when the imaging device 300 is inserted into the housing 200 through the washer fluid nozzle 260, the washer fluid may be dispensed and the imaging device 300 may be extended, thus sequentially performing the ejection of the washer fluid and the cleaning by the wiper. For example, the controller 400 may be configured to measure the degree of contamination of the camera module 320 based upon the conditions that the camera module 320 is exposed to the exterior and operate the exterior camera at cleaning speeds including at least three levels based on the measured degree of contamination. Furthermore, the controller 400 may be configured to measure the amount of precipitation with a rain sensor 600 under a condition of being driven in the rain, and when a predetermined amount of precipitation or greater is measured, the controller 400 may be configured to perform at least one cleaning control logic.

As described above, in an exemplary embodiment of the present disclosure, the controller 400 may be configured to adjust the operation speed of the imaging device 300 based on the amount of precipitation measured by the rain sensor 600. Accordingly, the exterior camera cleaning system may perform a cleaning control considering any one or combination of the vehicle speed, the driving environment of the vehicle, and the degree of contamination of the camera module 320.

Figure 8:
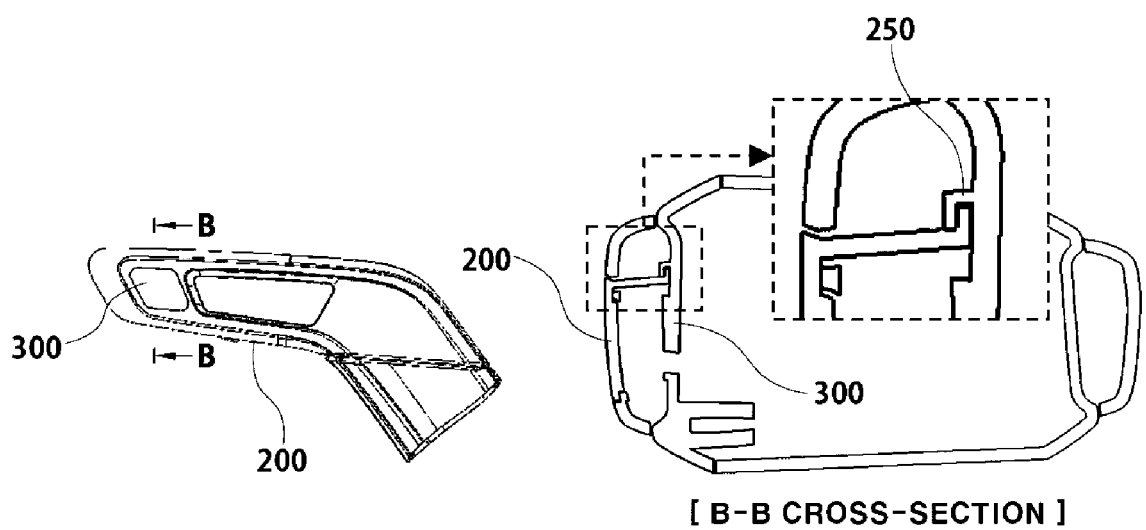
FIG. 8 is a cross-sectional diagram of the engagement relationship of the housing and the imaging device according to an exemplary embodiment of the present disclosure.

FIG. 8 is a side cross-sectional view illustrating the coupling between the housing 200 and the imaging device 300 according to an exemplary embodiment of the present disclosure. The imaging device 300 coupled to the inside of the housing 200 is illustrated, and at least one end of each of the housing 200 and the imaging device 300 may be coupled with a rail 250. FIG. 8 illustrates the rail 250 disposed on one end of the imaging device 300, and the imaging device 300 may include one end having a '⌈' shape (e.g., an L-shape rotated clockwise by 90°) as the rail 250, and one end of the housing 200 constitutes a '⌋' shape (e.g., an L-shape rotated counter-clockwise by 90°) to be coupled to the rail 250 having the '⌈' shape.

The housing 200 and the imaging device 300 thus coupled by the rail 250 may slidably guide the imaging device 300 when moving in the longitudinal direction of the housing 200. For example, the rail 250 may be disposed on a portion of the housing 200 in the longitudinal direction thereof, and when the imaging device 300 is disposed in the maximum open state, the coupling of the rail 250 between the housing 200 and the imaging device 300 may be released to allow the imaging device 300 to be dissembled from the housing 200.

Figure 9:
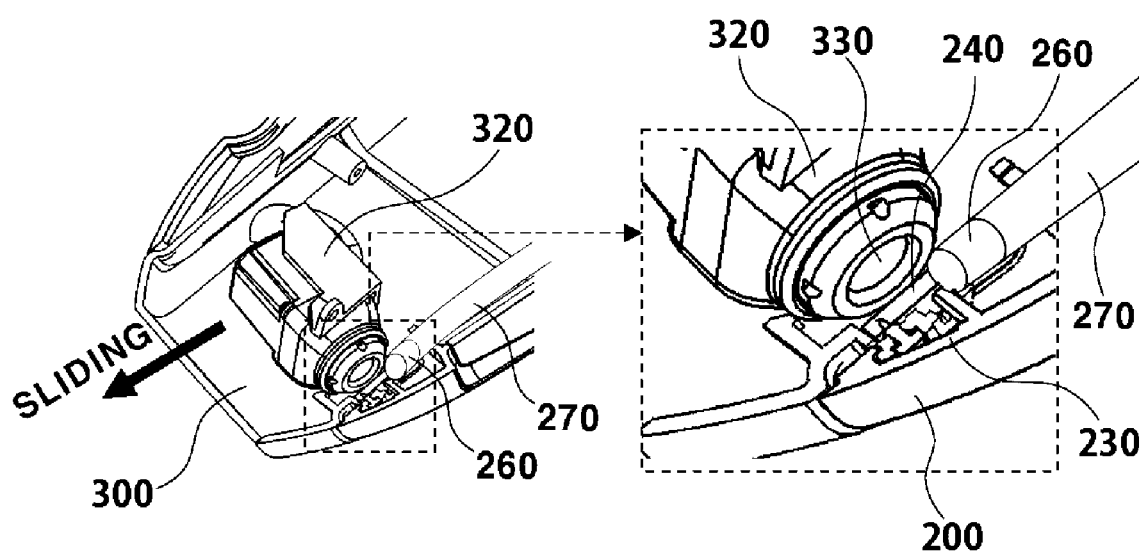
FIG. 9 is a diagram showing the wiper and the camera module according to an exemplary embodiment of the present disclosure.

FIG. 9 illustrates the coupled relationship for performing the cleaning of the camera module 320 according to an exemplary embodiment of the present disclosure. As illustrated, the wiper 240 may be disposed on the inside surface of the housing 200, and the housing cover cap 230 configured to be attachable and detachable to and from the housing 200 may be included. In an exemplary embodiment of the present disclosure, the housing cover cap 230 may be snap-fitted to the housing 200. For example, in an exemplary embodiment of the present disclosure, the wiper 240 may be inserted into a groove part disposed on the housing cover cap 230 to be selectively replaceable.

In addition, the washer fluid nozzle 260 may be disposed on the housing cover cap 230 to allow the wiper 240 and the washer fluid nozzle 260 to be selectively replaceable. The wiper 240 may be fixed to a position that faces the camera module 320, and when the imaging device 300 is slid in the longitudinal direction of the housing 200, the wiper 240 may contact the lens 330 of the camera module 320 to remove the contaminants attached to the lens 330.

The controller 400 may be configured to determine the degree of contamination of the camera module 320 and logically divide the lens 330 into grids to measure the number of grids where contamination is detected and perform the cleaning operation using the wiper 240 based upon the number of the measured grids. Further, the controller 400 may be configured to dispense the washer fluid simultaneously or in advance through the washer fluid nozzle 260 and subsequently remove the contamination on the camera module 320 physically by the wiper 240.

In summary, when the camera module 300 is cleaned under the condition that the imaging device 300 is in the open state, the cleaning by the wiper 240 may be performed first while the imaging device 300 moves to the inside of the housing 200, the washer fluid may be dispensed through the washer fluid nozzle 260 while the imaging device 300 is inserted into the housing 200, and the lens of the camera module 320 may be physically cleaned with the wiper 240 when the imaging device 300 is extended in the longitudinal direction.

An exemplary embodiment of the present disclosure may divide the degree of contamination into eight levels based on the brightness measured in each grid and classify the measured degree of contamination into three groups to perform the cleaning the camera module 320. In addition, in another exemplary embodiment of the present disclosure, the controller 400 may be configured to adjust the cleaning speed based on the driving conditions of the vehicle depending upon the degree of contamination, and in yet another exemplary embodiment, the controller 400 may be coupled with the rain sensor 600 to adjust the cleaning speed based on the amount of precipitation. The controller 400 may be configured to perform the cleaning of the camera module 320 based on the above-mentioned conditions and adjust the speed and the number of times that the imaging device 300 is inserted into and extended from the housing 200.

Figure 10:
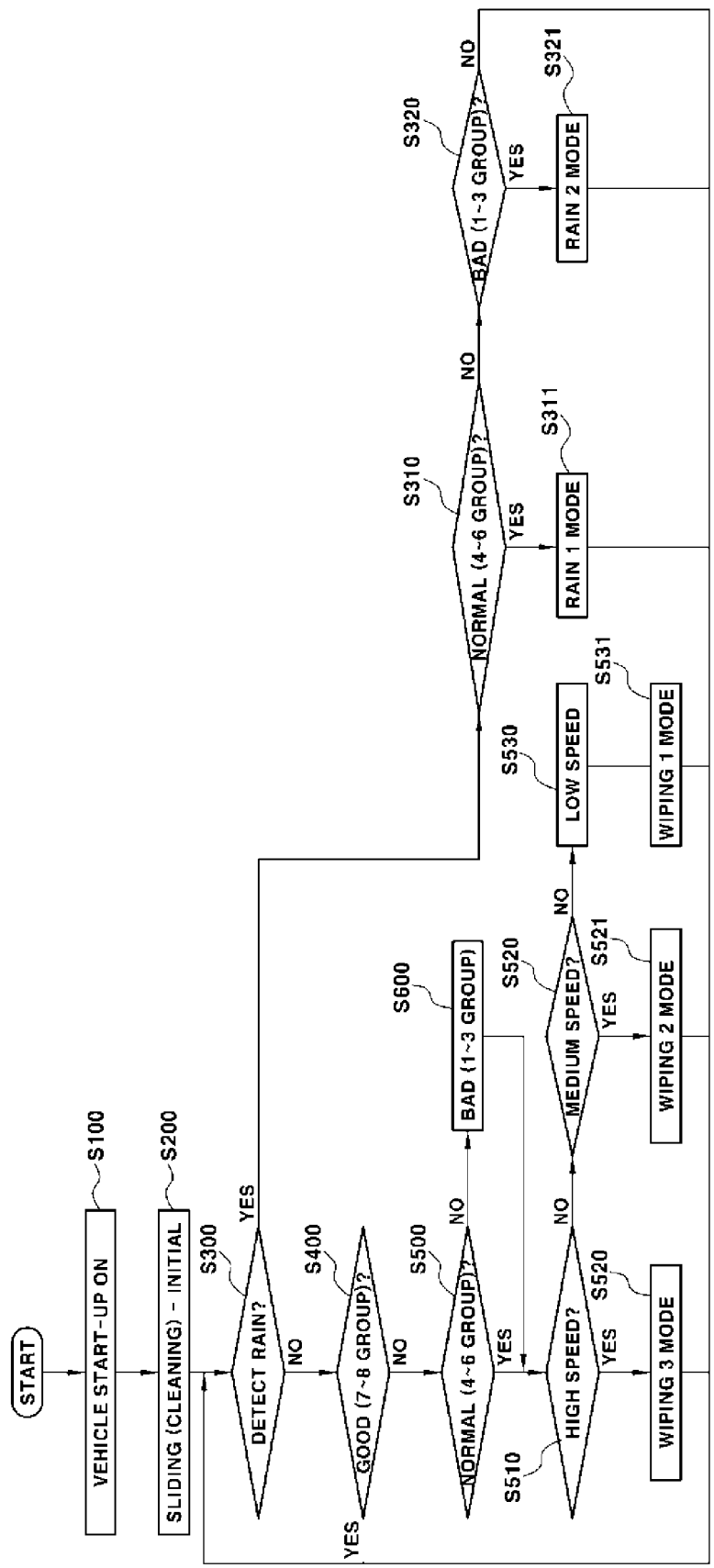
FIG. 10 is a flowchart for a method of performing the cleaning of the exterior camera lens according to an exemplary embodiment of the present disclosure.

FIG. 10 is a flowchart illustrating a method for cleaning the exterior camera lens 330 according to an exemplary embodiment of the present disclosure. As illustrated, the imaging device 300 may be initially protruded to the outside of the housing 200 when the ignition of the vehicle is ON S100, and the imaging device 300, which has been initially moved, may be configured to move while contacting the wiper 240 inside the housing 200 S200.

While the vehicle is being driven, the controller 400 may be configured to monitor the driving conditions of the vehicle, and in an exemplary embodiment of the present disclosure, may be configured to measure precipitation conditions S300. When the amount of precipitation measured by the rain sensor 600 disposed in the vehicle is equal to or greater than a predetermined value, the degree of contamination of the camera module 320 may be determined, and the cleaning using the wiper 240 may be performed based on the performed determination of the degree of contamination S310, S320.

For example, an exemplary embodiment of the present disclosure may logically (e.g., virtually) divide the lens 330 of the camera module 320 into a grid format, and the controller 400 may be configured to determine the degree of contamination (e.g., brightness) of each of the divided grids to classify the contamination of the camera module 320 into eight levels to perform the cleaning, for example, one cycle per second in the Groups 4 to 6 that correspond to low degrees of contamination (a Rain 1 mode) S311.

In contrast, in Groups 1 to 3 that correspond to high degrees of contamination of the camera module 320, the cleaning of the lens 330 may be performed, for example, three cycles per second (a Rain 2 mode) S321. However, the number of cycles per second to perform the cleaning depending upon the degree of contamination may be determined and/or adjusted by operator input settings.

In response to detecting that no precipitation is measured by the rain sensor 600 S300, the controller 400 may be configured to logically divide the lens 330 of the camera module 320 into a grid format and determine the degree of contamination (e.g., brightness) of each of the divided grids to classify the contamination of the camera module 320 into eight levels. The logic may be terminated in Groups 7 to 8 that correspond to low degrees of contamination S400, and when it is not in Groups 7 to 8 that correspond to the low degrees of contamination, it may be determined whether or not the degree of contamination is Groups 4 to 6 S500.

When the degree of contamination is Group 4 to 6, the cleaning may be performed at high speed S510 in a wiping 3 mode S511 depending upon the vehicle speed. When the vehicle speed is a medium speed S520, the cleaning may be performed in a wiping 2 mode S521, and when the vehicle speed is a low speed S530, the cleaning may be performed in a wiping 1 mode S531. In an exemplary embodiment of the present disclosure, the wiping 1 mode may perform the cleaning with one cycle per second, the wiping 2 mode two cycles per second, and the wiping 3 mode three cycles per second. In addition, when the degree of contamination is the Groups 4 to 6, the cleaning may be performed at different cycles based on the operating speed of the vehicle. For example, a high speed may be set to equal to or greater than about 60 KM/H, a medium speed from about 30 KM/H to less than about 60 KM/H, and a low speed less than about 30 KM/H.

When the degree of contamination is not Groups 4 to 6, but the degree of contamination is Groups 1 to 3 S600, the cleaning may be performed depending upon the wiping 1 mode to the wiping 3 mode considering the vehicle speed S511, S521, S531. However, the operating speed setting of the vehicle in the degree of contamination in Groups 1 to 3 S600 may be set lower than the operating speed setting in the degree of contamination degree in Groups 4 to 6. For example, a high speed may be set to be equal to or greater than about 50 KM/H, a medium speed to be from about 20 KM/H to less than about 50 KM/H, and a low speed to be less than about 20 KM/H.

As described above, an exemplary embodiment of the present disclosure may measure the degree of contamination in eight levels and set the horizontal (or linear) movement cycle of the imaging device 300 depending upon the measured degree of contamination, and set the number of cycles of the cleaning that the imaging device 300 is inserted into and protruded from the housing 200. In addition, in the respective modes, the washer fluid may be selectively dispensed to the camera module 320 through the washer fluid nozzle 260 during the cleaning. Further, the controller 400 may be configured to determine whether the vehicle is driven autonomously and set a particular cleaning cycle during the autonomous driving. In summary, the present disclosure provides a system for measuring the degree of contamination of the camera module 320 and adjusting the cleaning cycle based on the vehicle speed, thereby enhancing the view by the exterior camera.

The foregoing description illustrates the present disclosure. In addition, the foregoing description shows and explains the exemplary embodiments of the present disclosure, and the present disclosure may be used in various other combinations, modifications, and environments. Accordingly, changes and modifications thereof may be made within the scope of the present disclosure as disclosed in the specification, the disclosed descriptions and equivalent scopes thereof, and/or the skill or knowledge of the related art. The exemplary embodiments described above are intended to explain exemplary modes for implementing the technical spirit of the present disclosure, and various modifications required by the specific applications or uses of the present disclosure may be made. Accordingly, the description is not intended to limit the present disclosure to the exemplary embodiments disclosed herein. In addition, it is intended that the appended claims be construed to include alternative or additional embodiments.

What is claimed is:

1. An exterior camera lens cleaning method, comprising:
    determining, by a controller, a degree of contamination of a camera module;
    performing, by the controller, cleaning of the camera module when the degree of contamination of the camera module is equal to or greater than a predetermined reference; and
    adjusting, by the controller, a number of times that washer fluid is dispensed through a washer fluid nozzle and a number of times that an imaging device is inserted into a housing and then extended therefrom based on current driving state of a vehicle or a vehicle speed;
    wherein the housing is rotatably coupled to a base unit;
    wherein at least a portion of the camera module is inserted into the housing to move in a longitudinal direction of the housing and wherein a wiper is disposed within the housing to face the camera module;
    wherein the controller configured to set a rotation angle of the housing based upon driving conditions of the vehicle, and to adjust extension of the camera module; and
    wherein, when the housing is rotated, the camera module is configured to move synchronously with the housing horizontally in the longitudinal direction of the housing.

2. The exterior camera lens cleaning method of claim 1, further comprising:
    determining, by the controller, the degree of contamination of the camera module by logically dividing a screen into a plurality of grids to count a number of grids that are perceptible by the camera module.

3. The exterior camera lens cleaning method of claim 1, further comprising:
    determining, by the controller, the number of times that the washer fluid is dispensed through the washer fluid nozzle and the number of times that the imaging device is inserted into and then extended from the housing based upon the vehicle speed.

4. The exterior camera lens cleaning method of claim 1, wherein the housing is configured to have a particular folding speed when the vehicle is driven in an autonomous driving mode.

5. The exterior camera lens cleaning method of claim 1, further comprising:
    receiving, by the controller, an amount of precipitation from a rain sensor.

6. The exterior camera lens cleaning method of claim 5, further comprising:
    setting, by the controller, at least two levels of a folding speed of the housing based on the amount of the received precipitation.

* * * * *